Aug. 18, 1970   J. O. KING, JR   3,524,489
TWO-PIECE BLIND NUT ASSEMBLY
Filed Aug. 30, 1968   3 Sheets-Sheet 1
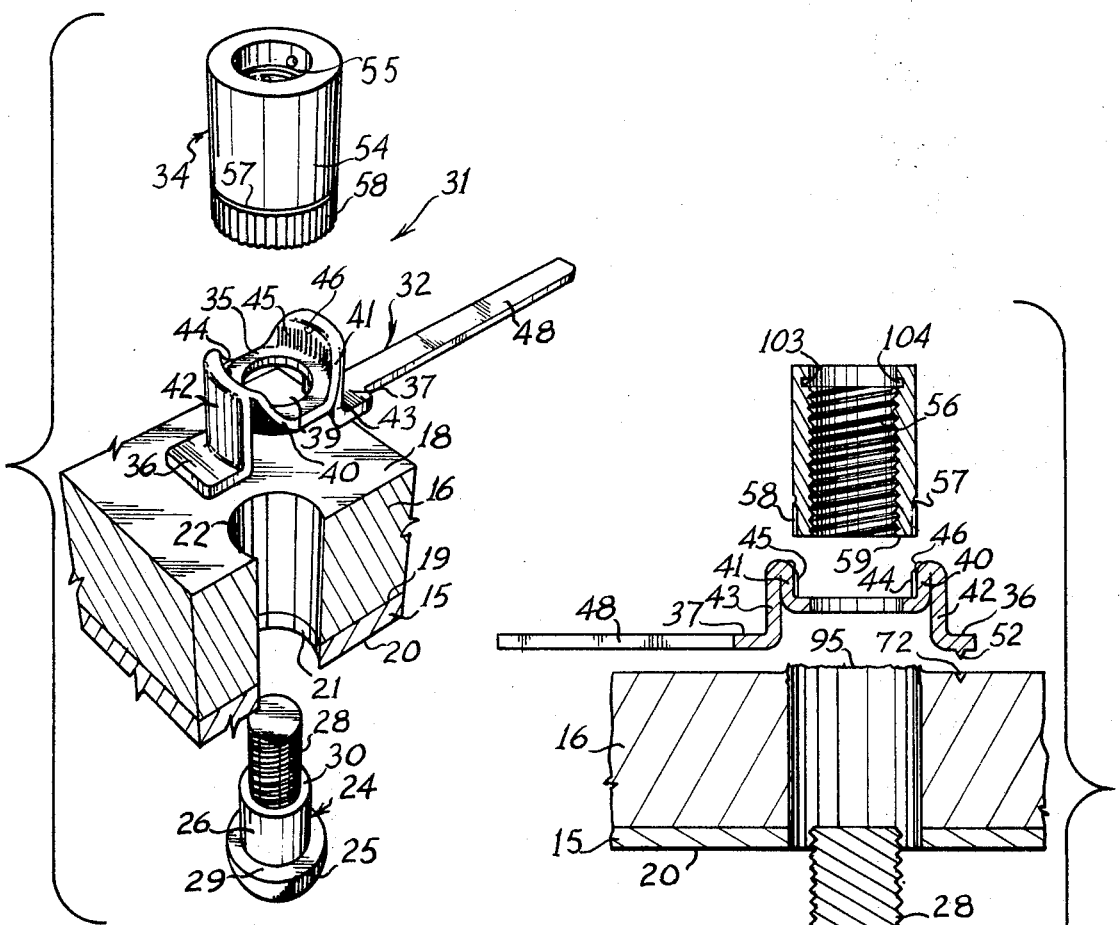
Fig. 1
Fig. 2
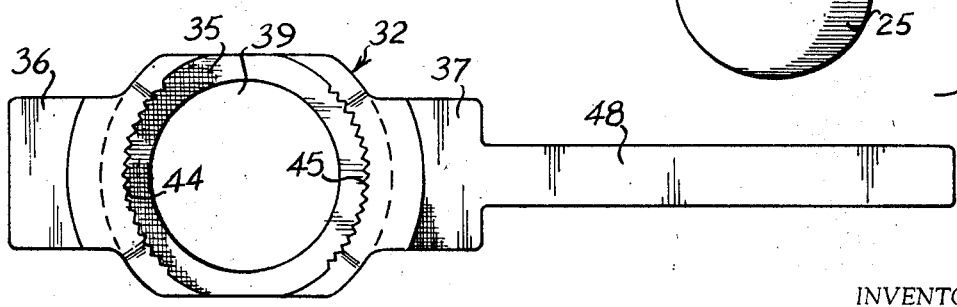
Fig. 3
INVENTOR.
John O. King, Jr.
BY
Jones & Thomas
ATTORNEYS Aug. 18, 1970

J. O. KING, JR 3,524,489

TWO-PIECE BLIND NUT ASSEMBLY

Filed Aug. 30, 1968

INVENTOR.
John O. King, Jr.
BY
Jones & Thomas
ATTORNEYS

Aug. 18, 1970     J. O. KING, JR     3,524,489

TWO-PIECE BLIND NUT ASSEMBLY

Filed Aug. 30, 1968     3 Sheets-Sheet 3

INVENTOR.
John O. King, Jr.
BY
Jones & Thomas
ATTORNEYS

United States Patent Office

3,524,489
Patented Aug. 18, 1970

3,524,489
TWO-PIECE BLIND NUT ASSEMBLY
John O. King, Jr., 711 Trabert Ave., NW.,
Atlanta, Ga. 30318
Filed Aug. 30, 1968, Ser. No. 756,464
Int. Cl. F16b *39/00*
U.S. Cl. 151—41.7                                      3 Claims

ABSTRACT OF THE DISCLOSURE

A two-piece nut assembly for a shoulder bolt for connecting together at least two juxtaposed apertured work pieces by inserting the nut assembly through the aligned apertures of the work pieces to the blind side of the work pieces. The nut assembly includes a support plate with an apertured support platform and support legs extending on opposite sides of the platform in such a manner that the support platform will be supported in spaced relationship from the blind side of the work piece by the support legs. An internally threaded nut of cylindrical configuration is threadable onto the threaded stub of a bolt which extends through the apertures of the work pieces and the aperture of the support platform. The support platform includes corrugated wall portions, and the nut includes a corrugated surface which mates with the wall portions of the platform, to prevent the nut and platform from rotating with respect to each other.

BACKGROUND OF THE INVENTION

In the construction of nuts or nut assemblies for use on the blind side of a work piece, it would be desirable to use a nut or nut assembly that is larger than the aperture of the work piece so that the nut would engage a large area of the blind side of the work piece. Of course, since the nut or the nut assembly must pass through the aperture of the work piece, the nut assembly must be small enough in thickness and width to pass through the aperture, and its length is the only dimension which can be greater than the width of the aperture. The conventional nut for a blind bore is inserted through the bore and turned so that its longest dimension extends across the bore and engages the blind side of the work piece. Since the outside dimensions of the nut must necessarily be smaller than the aperture of the work piece, the interior opening or threaded portion of the nut must be significantly smaller than the aperture of the work piece, and the bolt utilized with the nut must have a threaded portion engageable with the threads of a nut and also, be significantly smaller than the aperture of the work piece. Of course, since a nut and bolt assembly of small thread diameter is less strong than an assembly of larger dimensions, it may be necessary to enlarge the aperture of a work piece and utilize a nut and bolt assembly of larger dimensions to achieve the desired connecting strength; however, when the aperture of the work piece is enlarged the strength characteristics of the work piece are reduced.

While various nut assemblies have been developed for use on the blind side of a work piece, these devices are still significantly limited in their strength characteristics and practicality in use.

SUMMARY OF THE INVENTION

Briefly described, the present invention comprises a two piece nut assembly for use on the blind side of a work piece and connectable to the threaded stub of a shoulder bolt. The nut assembly includes an apertured support plate positionable against the blind surface of the work piece, with its aperture in alignment with the aperture of the work piece, and a nut alignable with the aperture of the support plate. The bolt is inserted through the aperture of the work piece, and its threaded stub engages the threads of the nut and pulls the nut into positive contact with the support plate. Since the nut is constructed separately from the support plate, the length of the nut is not limited by the diameter of the aperture of the work piece. Thus, the nut can be constructed with a large number of threads to engage the threaded stub of the bolt, thereby adding strength to the connection between the nut and bolt.

Thus, it is an object of this invention to provide a nut assembly for use on the blind side of a work piece which is convenient to use, inexpensive to manufacture, and which provides a larger threaded surface for engagement with the threads of a bolt.

Another object of this invention is to provide a nut assembly for use on the blind side of a work piece which makes a firm and rigid connection with a bolt and does not damage the aperture or blind surface of the work piece.

Another object of this invention is to provide a two piece nut assembly for use on the blind side of a work piece, the pieces of which can be individually inserted through the aperture of the work piece and assembled on the blind side of the work piece.

Other objects, advantages and features of the present invention will become apparent upon reading the following specification, when taken in conjunction with the accompanying drawing.

BRIEF DESCRIPTION OF THE DRAWING

FIG. 1 is an exploded perspective view of the nut assembly, work piece, and bolt.

FIG. 2 is an exploded side cross-sectional view of the nut assembly, work piece and bolt.

FIG. 3 is a plan view of the support plate of the nut assembly.

DESCRIPTION OF THE PREFERRED EMBODIMENTS

Figure 4:
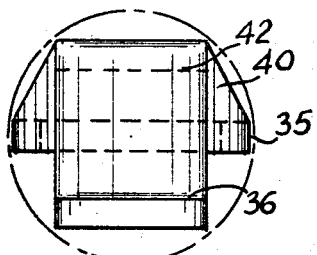
FIG. 4 is an end view of the support plate of the nut assembly, with the aperture of the work piece superimposed about the support plate.

Referring now more particularly to the drawing, in which like numerals indicate like parts throughout the several views, FIG. 1 shows work pieces 15 and 16, which include blind side 18, juxtaposed sides 19, and exterior side 20. Apertures 21 and 22 are drilled through work pieces 15 and 16, and are in alignment with each other and are of the same diameter. Shoulder bolt 24 is insertable through apertures 21 and 22 and includes head 25, shank 26, and threaded stub 28. Shank 26 is of a diameter substantially equal to the diameter of apertures 21 and 22 of work pieces 15 and 16, and the distance between the inside surface 29 of heat 25 and shoulder 30 of bolt 24 is approximately equal to the combined thicknesses of work pieces 15 and 16.

Figure 6:
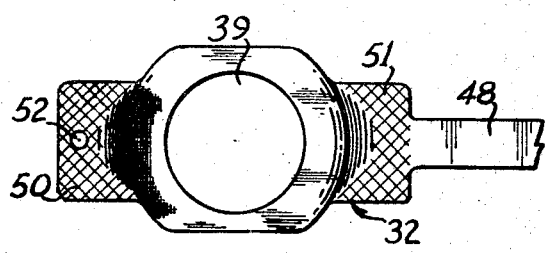
FIG. 6 is a bottom view of the support plate.

Nut assembly 31 includes support plate 32 and nut 34. As is shown in FIGS. 1, 2 and 3, support plate 32 includes support platform 35 and support legs 36 and 37. Support platform 35 defines aperture 39 which is equal to or slightly larger in diameter than the diameter of threaded stub 28 of shoulder bolt 24. Support platform 35 includes upwardly extending concave wall portions 40 and 41, while support legs 36 and 37 include upwardly extending wall portions 42 and 43. The wall portions 40 and 41 of support platform 35 are integrally connected to the wall portions 42 and 43 of support legs 36 and 37, respectively. Wall portions 42 and 43 of legs portions 36 and 37 are longer than wall portions 40 and 41 of platform 35, so that platform 35 is displaced upwardly from support legs 36 and 37. The surfaces of wall portions 40 and 41 facing aperture 39 of platform 35 are corrugated at 44 and 45. Locking bead 46 is formed in the upper portion of wall portion 41. Support leg 37 includes extension arm or projecting stem 48 which is coextensive with support leg 37. As is shown in FIG. 6, the bottom surfaces 50 and 51 of support legs 36 and 37 are knurled, and spike or projection 52 extends downwardly from bottom surface 50.

Nut 34 is generally of cylindrical configuration and includes outer surface 54, bore 55, internal threads 56, annular groove 57 and corrugations 58. The folds of corrugations 58 extend parallel to the longitudinal center line of bore 55, and are of a matching configuration with the corrugations 44 and 45 of support plate 32. The outside diameter of nut 34 is approximately equal to the distance between or diameter of the concave corrugated wall portions 40 and 41 of support platform 35. The internal diameter of bore 55 is approximately equal to the outside diameter of threaded stub 28 of shoulder bolt 24. Thus, nut 34 defines a bottom annular surface 59 (FIG. 2), so that when nut 34 is inserted between wall portions 40 and 41 of support plate 32, its bottom annular surface 59 will rest on support plaform 35. Annular groove 57 is spaced from bottom annular surface a distance equal to the spacing of locking bead 46 from support platform 35, so that locking bead snaps into groove 57 and locks nut 34 to support plate 32.

Figure 7:
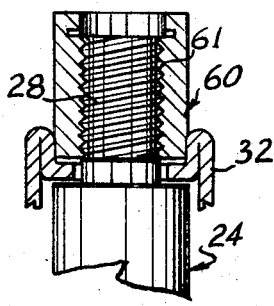
FIG. 7 is a side cross-sectional view of a nut assembly and bolt, showing a modified form of the nut.

As is shown in FIG. 7, a modified form of nut 34 would comprise nut 60 which is substantially identical to nut 34 but includes nylon locking feature or projection 61 which extends inwardly toward the axis of the bore of the nut. Projection 61 functions as a locking projection, and when bolt 24 is threaded into nut 60, projection 61 will engage threaded stub 28, which makes a tight friction fit with stub 28. In this manner, nut 60 will be locked onto bolt 24.

Figure 8:
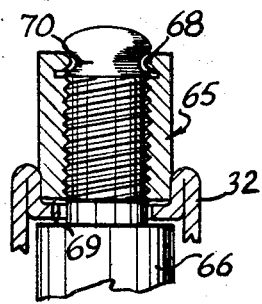
FIG. 8 is a side cross-sectional view, similar to FIG. 7, but showing another form of the nut.

FIG. 8 shows modified nut 65 and modified bolt 66. Nut 65 includes an inwardly extending annular flange 68 at the end opposite from its annular base or bottom surface 69, while bolt 66 includes an annular groove 70 at the end of its threaded stub 71. When bolt 66 is threaded into nut 65, annular flange 68 will snap into annular groove 70, which locks nuts 65 and bolt 66 together.

Figure 9:
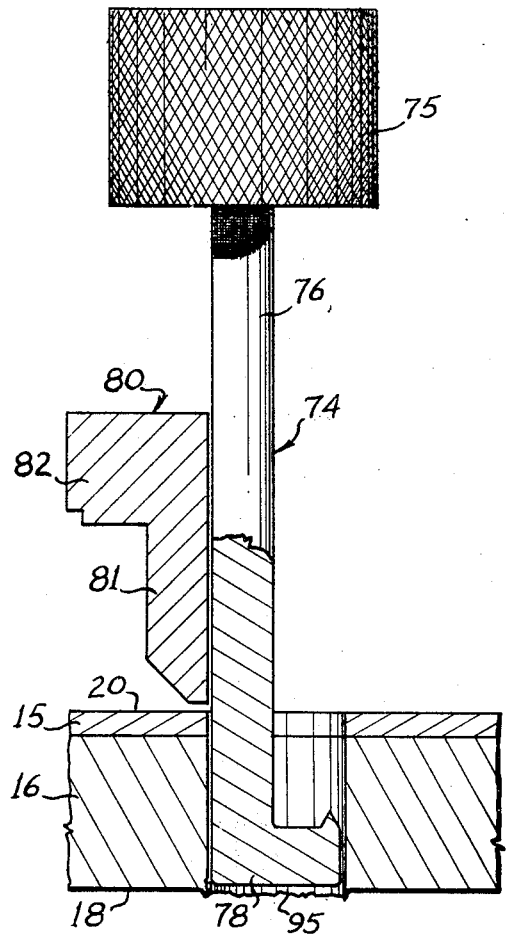
FIG. 9 is a side view, partly in cross-section, of a tool suitable for forming an indentation in the blind side of the work piece.
Figure 10:
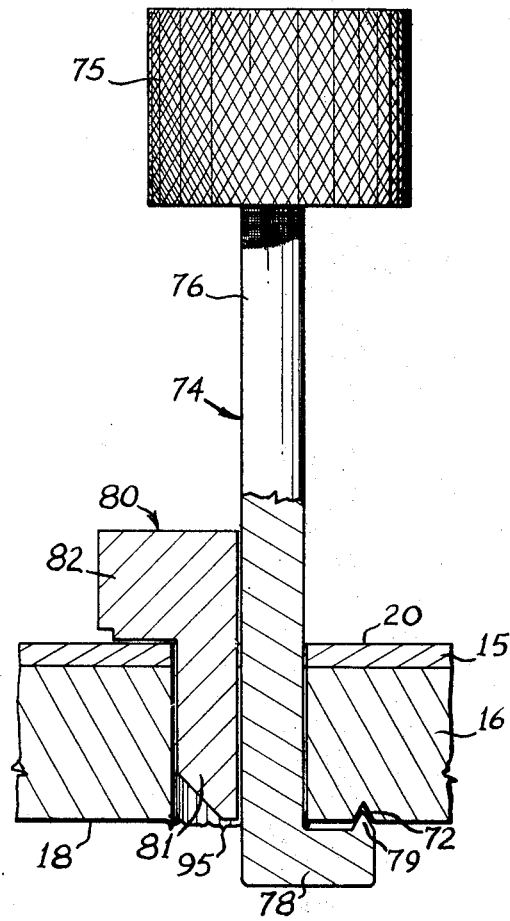
FIG. 10 is a side view, partly in cross-section, of the tool of FIG. 9, showing the manner in which the tool is inserted through the aperture of the work piece and functions to penetrate the blind side of the work piece.
Figure 11:
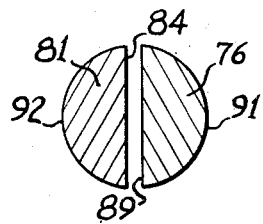
FIG. 11 is a cross-sectional view of the tool of FIGS. 9 and 10.

As is shown in FIGS. 9-11, a tool is required to form an indentation 72 in the blind side 18 of work piece 16. Tool 74 comprises cap 75, stem or shank 76, leg 78, and cutting bit 79. Leg 78 extends at a right angle from shank 76, and cutting bit 79 projects back toward shank 76. Collar 80 includes body portion 81 and flange 82. Body portion 81 and flange 82 are generally of semi-circular configuration and define flat surface 84 which is parallel to the longitudinal axis of body portion 81 and flange 82. Shank 76 is of a cross-sectional configuration similar to body portion 81 of collar 80 and includes flat surface 89 which is engageable with flat surface 84. Exterior surfaces 91 and 92 of shank 76 and body portion 81 are of matching curvature so that when shank 76 is placed adjacent collar 80 their curved surfaces are coextensive.

OPERATION

When it is desired to secure two work pieces together, such as work pieces 15 and 16, an aperture is formed in the work pieces by a conventional drill, so that aligned apertures 21 and 22 are created. Of course, when the drill breaks through the inside surface of work piece 16, a rough edge 95 usually will be created on the blind side of work piece 16. When the drill is withdrawn from the aligned apertures, tool 74 is inserted through the apertures, with its leg 78 passing through the apertures as shown in FIG. 9. After cutting bit 79 and leg 70 are positioned on the blind side of the work pieces, collar 80 is then slid along shank 76 of tool 74, until its body portion 81 enters the aligned apertures, and collar 80 rests against the outside surface of the work pieces. Tool 74 is then backed away from collar 80, so that cutting bit 79 engages and penetrates the inside or blind surface of the work pieces, and creates indentation 72. Tool 74 is then withdrawn from the work pieces.

Figure 5:
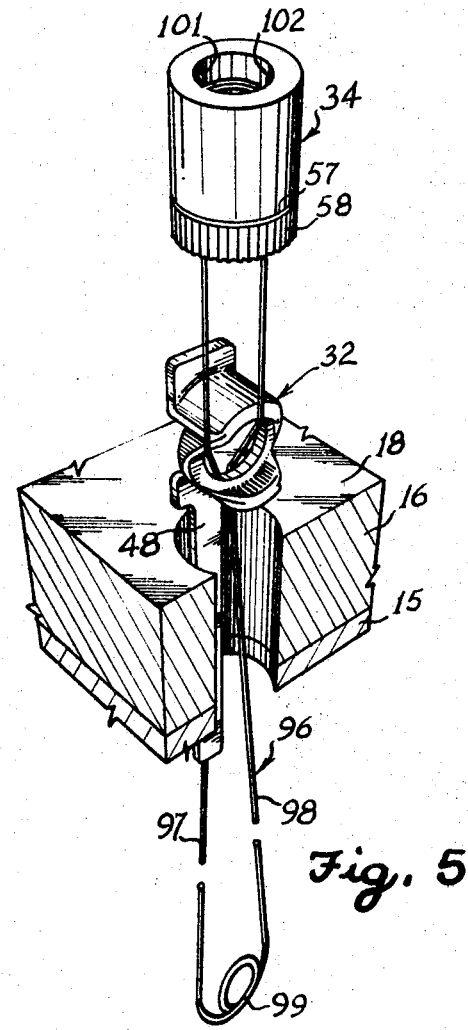
FIG. 5 is a perspective view of the nut assembly showing the manner in which the nut assembly is inserted through the aperture of a work piece.

An installing tool, such as lanyard 96 of FIG. 5, is utilized to insert the nut assembly 31 through the aligned apertures of the work pieces. Lanyard 96 includes arms 97 and 98 joined together at one of their ends by coil 99. Arms 97 and 98 terminate in outwardly extending feet 101 and 102. Arms 97 and 98 are inserted through aperture 39 of support plate 32, and through the bore of nut 34. Feet 101 and 102 are allowed to expand under the influence of coil 99 to grip the nut by feet 101 and 102 projecting into bores 103 and 104 (FIG. 2). Bottom surfaces 50 and 51 (FIG. 6) of support legs 36 and 37 are coated with an adhesive (not shown), either by applying the adhesive manually at this stage, or by coating the surfaces with adhesive prior to this stage and covering the adhesive with a removable strip of protective material in the conventionl manner. Also, the bottom annular surface 59 of nut 34 can be coated in a similar manner with adhesive, if desired.

Since the outside diameter of nut 34 is slightly smaller than the diameter of aligned apertures 21 and 22, and since support plate 32 is of a height and width slightly smaller than aligned apertures 21 and 22, nut 34 and support plate 32 can be inserted through aligned apertures 21 and 22 as is shown in FIG. 5, by manipulation of lanyard 96. After the nut assembly 31 has been inserted through the apertures to the blind side of work pieces 15 and 16, tool 96 is then backed up or partly withdrawn through the aligned apertures, whereupon support plate 32 will seat on the inside surface of the work pieces, as shown in FIG. 2. Nut 34 will be urged toward support platform 35 of support plate 32. The corrugations 58 of nut 34 will mate with the corrugations 44 and 45 of wall portions 40 and 41, and the bottom annular surface 59 of nut 34 will rest on support platform 35. As nut 34 is urged toward support platform 35, bead 46 of support plate 32 will snap into groove 57 of nut 34, locking nut 34 and support plate 32 together.

Figure 12:
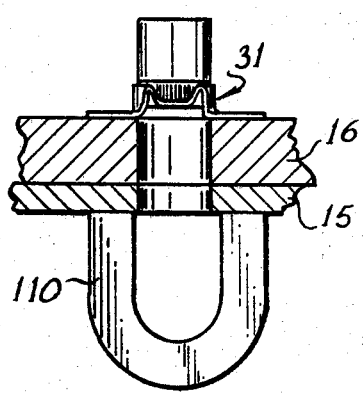
FIG. 12 is a side view, partially in cross-section of the nut assembly, work piece and magnet for holding the nut assembly in place on the work piece.

Lanyard 96 is then rotated to rotate nut 34 and support plate 32, until protrusion 52 of support plate 32 is inserted into indentation 72 (FIG. 2), whereupon the adhesive of the bottom surfaces of support legs 36 and 37 will make flat contact with the blind surface 18 of the work pieces. At this point nut assembly 31 will be securely connected to the blind side of the work pieces; however, it may be desirable to hold nut assembly 31 in positive contact with the blind side of the work pieces to insure positive connection to the work pieces. If this is the case, tension can be applied to lanyard 96 for a period of time until the cement on the bottom surfaces of the support legs 36 and 37 and on the bottom annular surface 59 of nut 34 cures. Also, magnet 110 (FIG. 12) can be positioned against the outside surface of the work piece to uniformly bias nut assembly 31 toward the work piece, and lanyard 96 can either be removed from the assembly or remain with the assembly until the cement dries, as may be desired. Magnet 110 can be either a permanent magnet or an electromagnet.

When it is desired to remove lanyard 96, arms 97 and 98 can be pinched together so that feet 101 and 102 are at least partially withdrawn from their respective holes, and lanyard 96 is then withdrawn from nut assembly 31 and aligned apertures 21 and 22 of the work pieces. A shoulder bolt 24 is then inserted through aligned apertures 21 and 22, until its threaded stub 28 engages threads 56 of nut 34, whereupon bolt 24 is rotated and threaded into an engagement with nut 34. As is shown in FIGS. 7 and 8, if a lock nut such as nut 60 or 65 is utilized, the bolt will be locked into connection with the nut.

Extension arm 48 functions to properly seat support plate 32 on the blind side of the work pieces, and in some cases limits the rotation of support plate 32. For instance, extension arm 48 will help guide support plate 32 from its position as shown in FIG. 5 to the position as shown in FIG. 2. Also, if support plate 32 tends to rotate after it has been positioned on the blind side of the work pieces, extension arm 48 will be likely to engage any protrusions or projections present on the blind surface of the work pieces, which tends to inhibit the rotation of the nut assembly 31. Of course, support plate 32 can be fabricated without extension arm 48 as might be required by a particular situation. For instance, if the space available on the blind side of work pieces 15 and 16 is limited so that inserting a long support plate would be cumbersome or impossible, it would be desirable to utilize a support plate that does not have an extension arm.

The adhesive applied to the bottom surface of the support arm of support plate 32 can vary, and it is not anticipated that any particular adhesive would be required for most situations since the adhesive functions merely to temporarily locate nut assembly 31 as bolt 24 is threaded into the assembly. The knurled surfaces 50 and 51 of support legs 36 and 37 insure that the adhesive will not be wiped from the bottom surfaces of support legs 36 and 37 as support plate 32 is rotated to seat its projection 52 into the recess 72 created on the blind side of the work pieces. Also, projection 52 functions to hold the bottom surfaces of support legs 36 and 37 away from the blind surface of the work pieces as support plate 32 is rotated, until projection 52 is seated in indentation 72.

Since support platform 35 is offset away from the blind side of the work piece, the distorted portion 95 of the blind surface of the work piece about aperture 22 will not interfere with support plate 32, as the support plate is drawn into an engagement with the blind side of the work piece. Furthermore, as bolt 24 is threaded into nut 34, wall portions 40 and 41 of support platform 35 will be supported against the outside of nut 34 as wall portions 42 and 43 of support legs 36 and 37 tend to bend toward nut 34. Since the main portions of support legs 36 and 37 are spaced away from the aligned apertures of the work piece, the forces exerted on the inside surface of the work pieces will be applied against a strong portion of the work pieces and will not tend to destroy or deform the apertures of the work pieces.

The longitudinal dimension of nut 34 is not limited by the dimensions of the aligned apertures of the workpieces since nut 34 passes through the apertures with its longitudinal axis parallel or coextensive with the axis of the apertures. Therefore, nut 34 can be constructed as long as desired, so that a larger number of threads are available to engage the threads of bolt 24 and form a strong fit between these elements.

While a single projection 52 (FIG. 2) has been shown on support plate 32, both bottom surfaces can be constructed with projections, and various other type locking arrangements may be utilized, such as knurled or corrugated surfaces. Also, while a particular lanyard has been shown, it should be understood that any lanyard constructed to grip the unit without effectively enlarging the outside diameter of the nut may be utilized. For instance, a lanyard having a deformable plastic or cork head or helical wire head can be threaded into nut 34 and removed from nut 34 by deforming or effectively shrinking the head of the lanyard.

At this point, it should be apparent that nut assembly 31 provides a connecting device which is passable through relatively small apertures to the blind side of the workpiece, and which is able to create an exceptionally strong connection with the threads of a bolt.

It will be obvious to those skilled in the art that many variations may be made in the embodiments chosen for the purpose of illustrating the present invention without departing from the scope thereof as defined by the appended claims.

I claim:

1. A nut assembly positionable on the blind side of an apertured workpiece for connection to a bolt extending through the aperture of the workpiece, said nut assembly comprising a unitary support plate of a configuration having a width and thickness suitable for passing through the aperture of the workpiece and a length substantially longer than the aperture of the workpiece, said support plate including a support platform positioned intermediate its thickness and defining an opening therein for receiving the shank of a bolt or the like, a first pair of concave wall members extending in a first direction generally normal to the surface of said support platform and positioned on opposed sides of said opening, the concave surfaces of said first pair of wall members defining spaced ribs extending away from said support platform, said first pair of wall members terminating in a second pair of wall members extending in doubled back relationship with said first pair of wall members, said second pair of wall members extending beyond said support platform and terminating in a pair of support legs extending generally parallel to and away from said support platform, and a nut receivable in the first pair of concave wall members, said nut including external rib members conforming to the shape of the spaced ribs of said first pair of concave wall members and defining a threaded opening of a diameter substantially equal to the diameter of the opening of said support platform.

2. The invention of claim 1 and further including a shoulder bolt for connection to said nut assembly, said shoulder bolt comprising a head of a diameter which is normally larger than the size of the opening of the work piece, a sank of a diameter which is normally equal to the diameter of the opening of the work piece, and a threaded stub of a diameter smaller than said shank and substantially equal to the diameter of the opening of the support platform and substantially equal to the diameter of the threaded opening of said nut.

3. The invention of claim 1 wherein said nut is of a length along the axis of its threaded opening which is larger than the distance between said first pair of concave wall members.

(References on following page)

References Cited

UNITED STATES PATENTS

| | | | |
|---|---|---|---|
| 1,036,858 | 8/1912 | Kennedy | 85—3 |
| 1,172,644 | 2/1916 | Trester. | |
| 1,516,242 | 11/1924 | Pierce | 85—3 |
| 1,733,693 | 10/1929 | Porter | 85—3 |
| 2,163,134 | 6/1939 | Semion | 151—27 |
| 2,235,078 | 3/1941 | Meistenhans | 151—41.7 |
| 2,880,830 | 4/1959 | Rohe | 151—7 |
| 2,883,012 | 4/1959 | Hoffman | 151—41.73 |
| 2,933,969 | 4/1960 | Hoyssen | 85—3 |
| 2,962,317 | 11/1960 | Morse | 151—37 |
| 3,244,056 | 4/1966 | Kern | 85—3 |
| 3,221,394 | 12/1965 | Pitts. | |
| 1,971,200 | 8/1934 | Proctor et al. | |

EDWARD C. ALLEN, Primary Examiner

U.S. Cl. X.R.

85—3